United States Patent [19]

Defretin

[11] Patent Number: 4,750,203
[45] Date of Patent: Jun. 7, 1988

[54] SUBSCRIBER TELEPHONE SET WITH AMPLIFIED LOUDSPEAKER RECEPTION WITH REDUCTION OF GAIN IN THE CASE OF AN INSUFFICIENT POWER SUPPLY

[75] Inventor: Bruno Defretin, St. Egreve, France
[73] Assignee: Thomson-CSF, Paris, France
[21] Appl. No.: 812,997
[22] Filed: Dec. 24, 1985

[30] Foreign Application Priority Data

Dec. 27, 1984 [FR] France .................. 84 19920

[51] Int. Cl.⁴ .............................................. H04M 1/60
[52] U.S. Cl. .................................... 379/390; 379/387
[58] Field of Search ............... 179/16 F, 81 B, 81 A, 179/81 R, 16 AA; 379/388, 389, 390, 395, 387, 406, 407, 394

[56] References Cited

U.S. PATENT DOCUMENTS

| | | | |
|---|---|---|---|
| 3,627,952 | 12/1971 | Jacques | 379/399 |
| 3,691,311 | 9/1972 | Wilson | 379/294 |
| 4,506,114 | 3/1985 | Burgin | 379/324 |
| 4,608,462 | 8/1986 | Blomely et al. | 379/390 |

FOREIGN PATENT DOCUMENTS 0063748 4/1982 European Pat. Off. .
2350014 4/1977 France .

*Primary Examiner*—Jin F. Ng
*Assistant Examiner*—R. Vaas
*Attorney, Agent, or Firm*—Oblon, Fisher, Spivak, McClelland & Maier

[57] ABSTRACT

The invention relates to a subscriber telephone set with amplified reception loudspeaker.

To avoid distortion of the signals transmitted to this loudspeaker should the power supply of the line be insufficient, it is provided for the amplifier feeding this loudspeaker to have its gain controlled by a signal resulting from the measurement of current passing through a shunt regulator serving for supplying the amplifier.

2 Claims, 1 Drawing Sheet

FIG_1
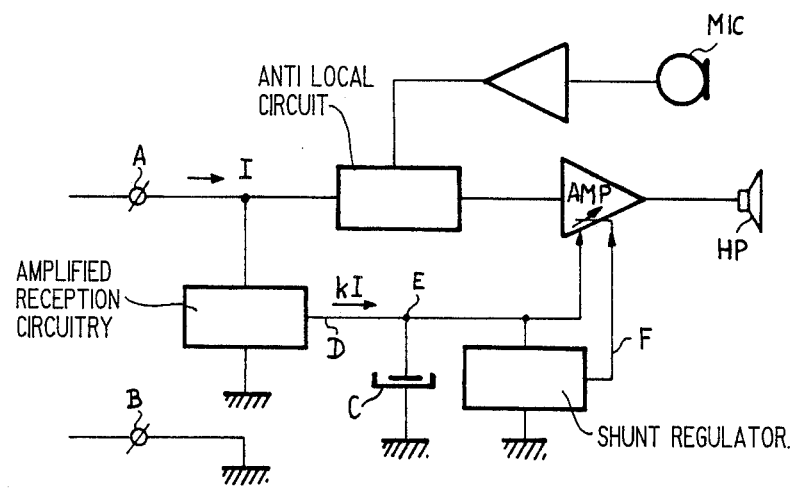
FIG_2
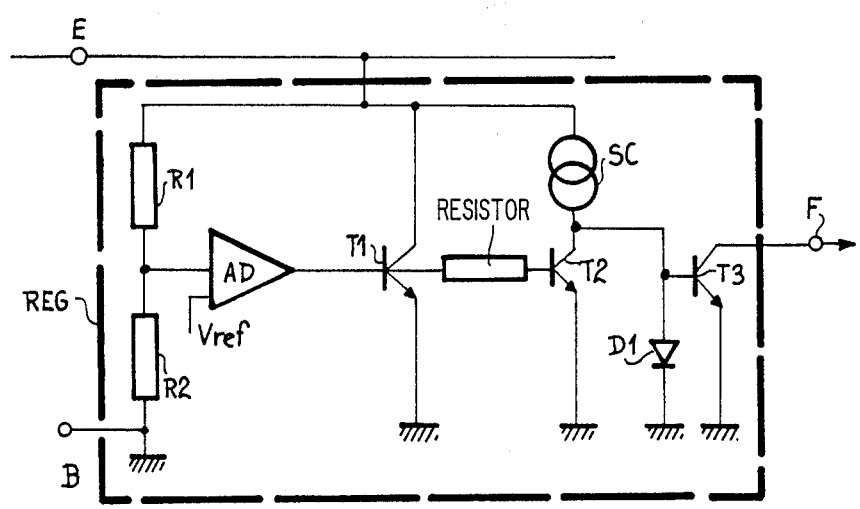

SUBSCRIBER TELEPHONE SET WITH AMPLIFIED LOUDSPEAKER RECEPTION WITH REDUCTION OF GAIN IN THE CASE OF AN INSUFFICIENT POWER SUPPLY

BACKGROUND OF THE INVENTION

The present invention relates to subscriber telephone sets.

Some sets are provided with amplified loud speaker reception for hearing the correspondant without holding the hand set near the ear.

This loudspeaker consumes considerable energy since it must provide a sound intensity level much higher than that of the loudspeaker of the hand set. Now, the power supply for the subscriber set is wholly supplied by the telephone line itself.

In the case where the power supply for the line is normal (for example during conversation), the energy received is sufficient for supplying the different functions of the set with power, including the supply for an amplifier coupled to the amplified reception loudspeaker. By way of example, a normal line power supply corresponds to a received current of the order of 15 to 150 milliamps at 4 volts.

But in the case where the supply for the line is no longer normal and becomes insufficient, for example if it drops below 10 milliamps, the amplifier of the amplified reception loudspeaker can no longer correctly play its role. In particular, it completely distorts the signals it receives. In general, the amplified reception loudspeaker is only required in cases where the power supply of the line is normal. But in some exceptional cases it may be needed even if the power supplied by the line is abnormally low.

An example of this abnormal situation is the following: some modern telephone sets are provided for allowing line connection without lifting the hand set; thus a number may be dialled without removing the hand set. It may then happen that the user is connected to the line and that, for one reason or another, no complete number is dialled. The telephone exchange is designed to wait until a call number has been dialled when the subscriber has been connected to the line; but if it receives no numbering signal at the end of a certain time, it emits a particular dialling tone and reduces the power supply of the line to a low value. The particular dialling tone is received by the set and is transmitted to the amplifier of the amplified reception loudspeaker. That is necessary for, in this type of set with line connection without the hand set being lifted, there must be absolutely a possibility of knowing whether the line is connected to the telephone exchange without any numbering signal having been sent to the exchange. Unfortunately, in this case, the power supply of the line is so reduced that the amplifier of the amplified reception loudspeaker transmits an extremely distorted signal which does not in practice allow the particular dialling tone set to be recognized or in any case which deforms it in an unacceptable way.

Other cases of distortion exist: in particular, when the signal to be amplified has too great an amplitude and requires for correct amplification power greater than that which is available on the line (even when the line is normally supplied). In addition, in this case, the reservoir capacitor which is often provided for the power supply of an amplified reception loudspeaker risks discharging; this leads to signal distortion which lasts until the capacitor is recharged even if the signal to be amplified has mean time resumed a normal amplitude level.

This is why the present invention proposes modifying the construction of subscriber telephone sets so as to overcome this type of fault.

SUMMARY OF THE INVENTION

The set of the invention, which comprises then an amplified reception loudspeaker and an amplifier for transmitting to the loudspeaker the alternating signals present on the line, further comprises:

a shunt voltage regulator receiving a fraction of the power supplied by the line, a means for detecting a current flowing through the shunt regulator, the amplifier being a controlled gain amplifier whose gain is controlled by the output of the detection means for reducing the gain of the amplifier to a lower value when the current flowing through the shunt regulator decreases appreciably.

BRIEF DESCRIPTION OF THE DRAWINGS

Other features and advantages of the invention will be clear from reading the following detailed description with reference to the accompanying drawings in which:

FIG. 1 shows a block diagram of the circuit of the invention, and

FIG. 2 shows a detailed example of a shunt regulator for implementing the invention.

DESCRIPTION OF THE PREFERRED EMBODIMENT

Since the invention only relates to a part of the circuits of a subscriber telephone set, the other different circuits of this set have only been shown very schematically. These circuits are only shown so as to better place the invention in its context.

In FIG. 1, a telephone line with two conductors 10 and 12 is connected to two line input terminals A and B, of the telephone set. It will be considered that terminal B forms an electric ground terminal for all the circuits of the set.

This line supplies both the DC and AC requirements of the different circuits of the set. It will be considered here, since it is generally the case, that the amplified reception circuits are supplied from a conductor D which transmits a current kI proportional to the current I flowing in the line. This current is used as power source for an amplified reception amplifier AMP feeding an external loudspeaker HP.

To provide this supply, a reservoir capacitor C is connected between an end terminal E of conductor D and ground B; a shunt regulator REG is also provided placed between terminal E and terminal B; such a regulator is also called "electronic zener", for it has the same function as a zener diode which would be placed between the terminals E and B: limitation of the voltage between these terminals and shunting a current which is all the higher when the voltage between terminals A and B tends to rise. The power supply for the amplifier AMP is taken between terminals E and B, i.e. in parallel across the shunt regulator.

The input of the amplifier AMP receives the alternating signals received from the line through a circuit AL called antilocal circuit whose function is to transmit the signal received from the telephone line while eliminating the signals emitted over the line from the microphone MIC of the set.

In accordance with the invention, the current shunted from terminal E towards terminal B in the shunt regulator is measured at an additional output F of the regulator and a corresponding measurement signal (current or voltage) is applied to a gain control terminal G of the amplifier AMP. The gain of the amplifier is made dependent on the current shunted by the shunt regulator in a direction tending to greatly limit the gain when the shunted current becomes small and corresponds to a line current value I insufficient for normally supplying the set with its amplified reception loudspeaker. An example of attenuation value may be 6 dB at maximum.

FIG. 2 shows by way of example an electronic zener circuit or shunt regulator with a circuit for detecting the shunted current. The regulator comprises a differential amplifier AD one input of which is connected to the middle point of a divider bridge R1 R2 placed between the terminals E and B and another input is connected to a reference voltage Vref. The output of the amplifier controls the base of a transistor T1 whose emitter and collector are connected respectively to the terminals B and E; another transistor T2 has its emitter connected to the terminal B, its collector connected to a current source SC supplied by terminal E and its base connected, possibly through a resistor R1, to the base of transistor T1. The current in the collector of transistor T2 forms a measurement of the current in the transistor T1. The difference between the current of source SC and the current in the collector of transistor T2 also forms a measurement signal of the current in transistor T1. This difference is fed into a diode D1 (connected between the collector of T1 and ground B) and it is recopied by a transistor T3 whose base is connected to the anode of diode D1 and whose emitter is connected to the cathode. The assembly of elements T2, T3, D1, SC form a means for detecting the shunted current in the shunt regulator.

The collector current of T3, all the higher the lower the current shunted by the regulator, so the lower the current supplying the line, forms a control signal for reducing the gain of the amplifier AMP. It is very well known how to form amplifiers whose gain is controlled by a current.

The current source SC allows a threshold to be fixed from which the gain regulation no longer acts at all. Thus, the amplifier is not at all subjected to a signal compression effect when the power supplied by the line exceeds a certain threshold. It is only below this lower limit, depending on the amplitude of the current of source SC, that gain reduction is progressively provided.

Of course the diagram of the regulator given in FIG. 2 with its detection means is only given by way of example.

What is claimed is:

1. A subscriber telephone set comprising:
an amplified reception loudspeaker, an amplifier for transmitting to the amplified reception loadspeaker the signals present on a telephone line and further comprising a shunt voltage regulator receiving a fraction of power supplied by said telephone line, and a means for detecting the current flowing through the shunt regulator, said amplifier being a variable gain amplifier with electrically controlled gain whose gain is continuously adjusted in response to the output of the detection means for reducing the gain of the amplifier to a lower value when the current flowing through the shunt regulator decreases significantly.

2. The telephone set as claimed in claim 1, wherein said detection means has a predetermined threshold below which a reduction of gain takes place progressively as a function of the reduction of the current flowing through the regulator and above which no reduction of gain takes place.

* * * * *